United States Patent
Tripathy et al.

(10) Patent No.: US 9,932,501 B2
(45) Date of Patent: *Apr. 3, 2018

(54) HYDROCARBON TACKIFIERS FOR LOW TEMPERATURE APPLICATION ADHESIVE COMPOSITIONS

(71) Applicant: ExxonMobil Chemical Patents Inc.

(72) Inventors: Ranjan Tripathy, Sugar Land, TX (US); Jean-Roch Schauder, Wavre (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/970,657

(22) Filed: Dec. 16, 2015

(65) Prior Publication Data

US 2016/0312082 A1    Oct. 27, 2016

Related U.S. Application Data

(60) Provisional application No. 62/151,500, filed on Apr. 23, 2015.

(51) Int. Cl.
| | | |
|---|---|---|
| *C09J 123/16* | (2006.01) | |
| *C08K 5/01* | (2006.01) | |
| *C09J 123/10* | (2006.01) | |

(52) U.S. Cl.
CPC .................................. *C09J 123/10* (2013.01)

(58) Field of Classification Search
CPC ................................ C08K 5/01; C09J 123/16
USPC .................................................. 524/474, 528
See application file for complete search history.

(56) References Cited

U.S. PATENT DOCUMENTS

| | | |
|---|---|---|
| 6,433,104 B1 | 8/2002 | Macedo et al. |
| 6,881,800 B2 | 4/2005 | Friedersdorf |
| 7,232,871 B2 | 6/2007 | Datta et al. |
| 7,294,681 B2 | 11/2007 | Jiang et al. |
| 7,524,910 B2 | 4/2009 | Jiang et al. |
| 2004/0249046 A1* | 12/2004 | Abhari .................. C09J 123/10 524/474 |

FOREIGN PATENT DOCUMENTS

| | | |
|---|---|---|
| WO | 2013/134038 | 9/2013 |
| WO | 2015/164017 | 10/2015 |

OTHER PUBLICATIONS

Cheng, H.N. "$^{13}$C NMR Analysis of Ethylene-Propylene Rubbers", Macromolecules, 1984, vol. 17, pp. 1950-1955.
Sun, T. et al., "Effect of Short Chain Branching on the Coil Dimensions of Polyolefins in Dilute Solution", Macromolecule, 2001, vol. 34, pp. 6812-6820.
Fox, T.G., "Second Order Transition Temperatures and Related Properties of Polystyrene", Journal of Applied Physics 21, (1950), pp. 581-591.
Kirk-Othmer Encyclopedia of Chemical Technology, 4th Ed., vol. 13, pp. 717-744.

* cited by examiner

Primary Examiner — Deve E Valdez

(57) ABSTRACT

The present invention is related to an adhesive composition comprising a 50-95 wt % polymer blend and a tackifier. The blend has a first and second propylene-based polymer, both different homopolymers of propylene or a copolymer of propylene and ethylene or a $C_4$ to $C_{10}$ alpha-olefin. The blend has a melt viscosity, measured at 190° C., of 1,000 to 30,000 cP and a crystallization temperature of greater than 60° C. The tackifier has a softening point of 85° C. to 105° C., an aromaticity of 5 mol % to 15 mol % aromatic protons, and a Cloud Point of 45° C. to 75° C.

12 Claims, No Drawings

HYDROCARBON TACKIFIERS FOR LOW TEMPERATURE APPLICATION ADHESIVE COMPOSITIONS

CROSS REFERENCE TO RELATED APPLICATIONS

This application claims the benefit of Ser. No. 62/151,500, filed Apr. 23, 2015, the disclosure of which is hereby incorporated by reference in its entirety.

FIELD OF INVENTION

The invention relates to hydrocarbon tackifiers for polyolefin adhesive compositions for use in packaging articles at low temperatures.

BACKGROUND

Adhesive composition components such as base polymers, tackifiers, waxes, and oils are customarily provided as separate components for formulation into hot melt adhesive (HMA) compositions. In HMA packaging applications, adhesive compositions are sought that provide a desired combination of physical properties, such as reduced set time and improved mechanical strength, including fiber tear and failure mode for broad application temperature ranges.

Exemplary base polymer compositions and methods of making polymer compositions for HMA applications that can be used for packaging applications are disclosed in U.S. Pat. Nos. 7,294,681 and 7,524,910. Various polymers described in these patents and/or produced by the methods disclosed in these patents have been sold by ExxonMobil Chemical Company as LINXAR™ polymers.

International Publication No. 2013/134038 discloses a method for producing a polymer blend having at least two different propylene-based polymers produced in parallel reactors. The multi-modal polymer blend has a Mw of about 10,000 g/mol to about 150,000 g/mol. International Publication No. WO2015/164017 filed on Mar. 24, 2015 discloses an adhesive composition having 50-95 wt % of the polymer blend disclosed in International Publication No. 2013/134038 and a tackifier having a softening point of 95-115° C., an aromaticity of 3-10 mol % aromatic protons, and a cloud point of 40-65° C.

Many different types of polymers and tackifiers are known and have been used in HMA formulations for packaging applications. Generally, adhesive formulations for these applications are prepared by combining polymer, tackifier, and wax in equal quantities. However, there remains a need for a tackified adhesive formulation that has the new base polymer combined with one or more tackifiers that is suitable for low temperature applications.

SUMMARY

In one aspect, the present invention relates to an adhesive composition comprising: a polymer blend comprising a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer; wherein the polymer blend has a melt viscosity, measured at 190° C. of about 1,000 to about 30,000 cP and a crystallization temperature of greater than 60° C.; wherein the polymer blend is present in the amount of about 50 wt % to about 95 wt % of the adhesive composition; and a tackifier; wherein tackifier has a softening point as determined by ASTM E-28 of about 85° C. to about 105° C., an aromaticity of about 5 mol % to about 15 mol % aromatic protons, and a Cloud Point of 45° C. to about 75° C.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

The inventors have discovered adhesive compositions utilizing one or more tackifiers combined with a base polymer, such that the adhesive composition is suitable for low temperature applications. While International Publication No. WO2015/164017 filed on Mar. 24, 2015, discloses the use of tackifiers having certain softening point, aromaticity, and cloud point ranges to achieve high fiber tear for packaging applications, the inventors have unexpectedly discovered that a selection of those tackifiers can impart good adhesive strength at low temperatures.

The inventive adhesives may be produced using a new process platform that is more robust and lacks many of the limitations and difficulties associated with the processes employed to make LINXAR™ polymers and those disclosed in U.S. Pat. Nos. 7,294,681 and 7,524,910. Advantageously, about 50 wt % to about 95 wt % of one or more polymer blends is used in adhesive formulations when the polymer blend has a melt viscosity of about 1,000 cP to about 30,000 cP.

A. Methods of Preparing Polymer Blends and Compositions

A solution polymerization process for preparing polymer blends is generally performed by a system that includes a first reactor, a second reactor in parallel with the first reactor, a liquid-phase separator, a devolatilizing vessel, and a pelletizer. The first reactor and second reactor may be, for example, continuous stirred-tank reactors.

The first reactor may receive a first monomer feed, a second monomer feed, and a catalyst feed. The first reactor may also receive feeds of a solvent and an activator. The solvent and/or the activator feed may be combined with any of the first monomer feed, the second monomer feed, or catalyst feed or the solvent and activator may be supplied to the reactor in separate feed streams. A first polymer is produced in the first reactor and is evacuated from the first reactor via a first product stream. The first product stream comprises the first polymer, solvent, and any unreacted monomer.

In any embodiment, the first monomer in the first monomer feed may be propylene and the second monomer in the second monomer feed may be ethylene or a $C_4$ to $C_{10}$ olefin. In any embodiment, the second monomer may be ethylene, butene, hexene, and octene. Generally, the choice of monomers and relative amounts of chosen monomers employed in the process depends on the desired properties of the first polymer and final polymer blend. For adhesive compositions, ethylene and hexene are particularly preferred comonomers for copolymerization with propylene. In any embodiment, the relative amounts of propylene and comonomer supplied to the first reactor may be designed to produce a polymer that is predominantly propylene, i.e., a polymer that is more than 50 mol % propylene. In another embodiment, the first reactor may produce a homopolymer of propylene.

The second polymer is different than the first polymer. The difference may be measured, for example, by the comonomer content, heat of fusion, crystallinity, branching index, weight average molecular weight, and/or polydispersity of the two polymers. In any embodiment, the second polymer may comprise a different comonomer than the first polymer or one polymer may be a homopolymer of propylene and the other polymer may comprise a copolymer of propylene and ethylene or a $C_4$ to $C_{10}$ olefin. For example, the first polymer may comprise a propylene-ethylene copolymer and the second polymer may comprise a propylene-hexene copolymer. In any embodiment, the second polymer may have a different weight average molecular weight (Mw) than the first polymer and/or a different melt viscosity than the first polymer. Furthermore, in any embodiment, the second polymer may have a different crystallinity and/or heat of fusion than the first polymer.

It should be appreciated that any number of additional reactors may be employed to produce other polymers that may be integrated with (e.g., grafted) or blended with the first and second polymers. Further description of exemplary methods for polymerizing the polymers described herein may be found in U.S. Pat. No. 6,881,800, which is incorporated by reference herein.

The first product stream and second product stream may be combined to produce a blend stream. For example, the first product stream and second product stream may supply the first and second polymer to a mixing vessel, such as a mixing tank with an agitator.

The blend stream may be fed to a liquid-phase separation vessel to produce a polymer rich phase and a polymer lean phase. The polymer lean phase may comprise the solvent and be substantially free of polymer. At least a portion of the polymer lean phase may be evacuated from the liquid-phase separation vessel via a solvent recirculation stream. The solvent recirculation stream may further include unreacted monomer. At least a portion of the polymer rich phase may be evacuated from the liquid-phase separation vessel via a polymer rich stream.

In any embodiment, the liquid-phase separation vessel may operate on the principle of Lower Critical Solution Temperature (LCST) phase separation. This technique uses the thermodynamic principle of spinodal decomposition to generate two liquid phases; one substantially free of polymer and the other containing the dissolved polymer at a higher concentration than the single liquid feed to the liquid-phase separation vessel.

Employing a liquid-phase separation vessel that utilizes spinodal decomposition to achieve the formation of two liquid phases may be an effective method for separating solvent from multi-modal polymer blends, particularly in cases in which one of the polymers of the blend has a weight average molecular weight less than 100,000 g/mol, and even more particularly between 10,000 g/mol and 60,000 g/mol. The concentration of polymer in the polymer lean phase may be further reduced by catalyst selection.

Upon exiting the liquid-phase separation vessel, the polymer rich stream may then be fed to a devolatilizing vessel for further polymer recovery. In any embodiment, the polymer rich stream may also be fed to a low pressure separator before being fed to the inlet of the devolatilizing vessel. While in the vessel, the polymer composition may be subjected to a vacuum in the vessel such that at least a portion of the solvent is removed from the polymer composition and the temperature of the polymer composition is reduced, thereby forming a second polymer composition comprising the multi-modal polymer blend and having a lower solvent content and a lower temperature than the polymer composition as the polymer composition is introduced into the vessel. The polymer composition may then be discharged from the outlet of the vessel via a discharge stream.

The cooled discharge stream may then be fed to a pelletizer where the multi-modal polymer blend is then discharged through a pelletization die as formed pellets. Pelletization of the polymer may be by an underwater, hot face, strand, water ring, or other similar pelletizer. Preferably an underwater pelletizer is used, but other equivalent pelletizing units known to those skilled in the art may also be used. General techniques for underwater pelletizing are known to those of ordinary skill in the art.

Exemplary methods for producing useful polymer blends are further described in International Publication No. 2013/134038, which is incorporated herein in its entirety. In particular, the catalyst systems used for producing semi-crystalline polymers of the polymer blend may comprise a metallocene compound and activator such as those described in International Publication No. 2013/134038. Exemplary catalysts may include dimethylsilyl bis(2-methyl-4-phenylindenyl) zirconium dichloride, dimethylsilyl bis(2-methyl-5-phenylindenyl) hafnium dichloride, dimethylsilyl bis(2-methyl-4-phenylindenyl) zirconium dimethyl, and dimethylsilyl bis(2-methyl-4-phenylindenyl) hafnium dimethyl.

B. Polymers

As described herein, the polymer blend comprises a first propylene-based polymer and a second propylene-based polymer. Preferred first and/or second propylene-based polymers of the polymer blend are semi-crystalline propylene-based polymers. In any embodiment, the polymers may have a relatively low molecular weight, preferably about 150,000 g/mol or less. In any embodiment, the polymer may comprise a comonomer selected from the group consisting of ethylene and linear or branched $C_4$ to $C_{20}$ olefins and diolefins. In any embodiment, the comonomer may be ethylene or a $C_4$ to $C_{10}$ olefin.

The term "polymer" as used herein includes, but is not limited to, homopolymers, copolymers, interpolymers, terpolymers, etc. and alloys and blends thereof. Further, as used herein, the term "copolymer" is meant to include polymers having two or more monomers, optionally with other monomers, and may refer to interpolymers, terpolymers, etc. The term "polymer" as used herein also includes impact, block, graft, random and alternating copolymers. The term "polymer" shall further include all possible geometrical configurations unless otherwise specifically stated. Such configurations may include isotactic, syndiotactic and random symmetries. The term "polymer blend" as used herein includes, but is not limited to a blend of one or more polymers prepared in solution or by physical blending, such as melt blending.

"Propylene-based" as used herein, is meant to include any polymer comprising propylene, either alone or in combination with one or more comonomers, in which propylene is the major component (i.e., greater than 50 mol % propylene).

In any embodiment, one or more polymers of the polymer blend may comprise one or more propylene-based polymers, which comprise propylene and from about 2 mol % to about 30 mol % of one or more comonomers selected from $C_2$ and $C_4$-$C_{10}$ α-olefins. In any embodiment, the α-olefin comonomer units may derive from ethylene, butene, pentene, hexene, 4-methyl-1-pentene, octene, or decene. The embodiments described below are discussed with reference to ethylene and hexene as the α-olefin comonomer, but the embodiments are equally applicable to other copolymers with other α-olefin comonomers. In this regard, the copolymers may simply be referred to as propylene-based polymers with reference to ethylene or hexene as the α-olefin.

In any embodiment, the one or more propylene-based polymers of the polymer blend may include at least about 5 mol %, at least about 6 mol %, at least about 7 mol %, or at least about 8 mol %, or at least about 10 mol %, or at least about 12 mol % ethylene-derived or hexene-derived units. In those or other embodiments, the copolymers of the propylene-based polymer may include up to about 30 mol %, or up to about 25 mol %, or up to about 22 mol %, or up to about 20 mol %, or up to about 19 mol %, or up to about 18 mol %, or up to about 17 mol % ethylene-derived or hexene-derived units, where the percentage by mole is based upon the total moles of the propylene-derived and α-olefin derived units. Stated another way, the propylene-based polymer may include at least about 70 mol %, or at least about 75 mol %, or at least about 80 mol %, or at least about 81 mol % propylene-derived units, or at least about 82 mol % propylene-derived units, or at least about 83 mol % propylene-derived units; and in these or other embodiments, the copolymers of the propylene-based polymer may include up to about 95 mol %, or up to about 94 mol %, or up to about 93 mol %, or up to about 92 mol %, or up to about 90 mol %, or up to about 88 mol % propylene-derived units, where the percentage by mole is based upon the total moles of the propylene-derived and alpha-olefin derived units. In any embodiment, the propylene-based polymer may comprise from about 5 mol % to about 25 mol % ethylene-derived or hexene-derived units, or from about 8 mol % to about 20 mol % ethylene-derived or hexene-derived units, or from about 12 mol % to about 18 mol % ethylene-derived or hexene-derived units.

The one or more polymers of the blend of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

In any embodiment, the Tm of the one or more polymers of the blend (as determined by DSC) may be less than about 130° C., or less than about 125° C., less than about 120° C., or less than about 115° C., or less than about 110° C., or less than about 100° C., or less than about 90° C., and greater than about 70° C., or greater than about 75° C., or greater than about 80° C., or greater than about 85° C. In any embodiment, the Tm of the one or more polymers of the blend may be greater than about 25° C., or greater than about 30° C., or greater than about 35° C., or greater than about 40° C. Tm of the polymer blend can be determined by taking 5 to 10 mg of a sample of the polymer blend, equilibrating a DSC Standard Cell FC at −90° C., ramping the temperature at a rate of 10° C. per minute up to 200° C., maintaining the temperature for 5 minutes, lowering the temperature at a rate of 10° C. per minute to −90° C., ramping the temperature at a rate of 10° C. per minute up to 200° C., maintaining the temperature for 5 minutes, and recording the temperature as Tm.

In one or more embodiments, the crystallization temperature (Tc) of the polymer blend (as determined by DSC) is less than about 110° C., or less than about 90° C., or less than about 80° C., or less than about 70° C., or less than about 65° C. In the same or other embodiments, the Tc of the polymer is greater than about 60° C.

The polymers suitable for use herein are said to be "semi-crystalline", meaning that in general they have a relatively low crystallinity. The term "crystalline" as used herein broadly characterizes those polymers that possess a high degree of both inter and intra molecular order, and which preferably melt higher than 110° C., more preferably higher than 115° C., and most preferably above 130° C. A polymer possessing a high inter and intra molecular order is said to have a "high" level of crystallinity, while a polymer possessing a low inter and intra molecular order is said to have a "low" level of crystallinity. Crystallinity of a polymer can be expressed quantitatively, e.g., in terms of percent crystallinity, usually with respect to some reference or benchmark crystallinity. As used herein, crystallinity is measured with respect to isotactic polypropylene homopolymer. Preferably, heat of fusion is used to determine crystallinity. Thus, for example, assuming the heat of fusion for a highly crystalline polypropylene homopolymer is 190 J/g, a semi-crystalline propylene copolymer having a heat of fusion of 95 J/g will have a crystallinity of 50%. The term "crystallizable" as used herein refers to those polymers which can crystallize upon stretching or annealing.

Thus, in certain specific embodiments, the semi-crystalline polymer may be crystallizable. The semi-crystalline polymers used in specific embodiments of this invention preferably have a crystallinity of from 2% to 65% of the crystallinity of isotatic polypropylene. In further embodiments, the semi-crystalline polymers may have a crystallinity of from about 3% to about 40%, or from about 4% to about 30%, or from about 5% to about 25% of the crystallinity of isotactic polypropylene.

The semi-crystalline polymer of the polymer blend can have a level of isotacticity expressed as percentage of isotactic triads (three consecutive propylene units), as measured by $^{13}C$ NMR, of 75 mol % or greater, 80 mol % or greater, 85 mol % or greater, 90 mol % or greater, 92 mol % or greater, 95 mol % or greater, or 97 mol % or greater. In one or more embodiments, the triad tacticity may range from about 75 mol % to about 99 mol %, or from about 80 mol % to about 99 mol %, or from about 85 mol % to about 99 mol %, or from about 90 mol % to about 99 mol %, or from about 90 mol % to about 97 mol %, or from about 80 Mol % to about 97 mol %. Triad tacticity is determined by the methods described in U.S. Pat. No. 7,232,871.

The semi-crystalline polymer of the polymer blend may have a tacticity index m/r ranging from a lower limit of 4, or 6 to an upper limit of 10, or 20, or 25. The tacticity index, expressed herein as "m/r", is determined by $^{13}C$ nuclear magnetic resonance ("NMR"). The tacticity index m/r is calculated as defined by H. N. Cheng in 17 MACROMOLECULES, 1950 (1984), incorporated herein by reference. The designation "m" or "r" describes the stereochemistry of pairs of contiguous propylene groups, "m" referring to meso and "r" to racemic. An m/r ratio of 1.0 generally describes an atactic polymer, and as the m/r ratio approaches zero, the polymer is increasingly more syndiotactic. The polymer is increasingly isotactic as the m/r ratio increases above 1.0 and approaches infinity.

In one or more embodiments, the semi-crystalline polymer of the polymer blend may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature and determined according to ASTM D-792. As used herein, the term "room temperature" is used to refer to the temperature range of about 20° C. to about 23.5° C.

In one or more embodiments, the semi-crystalline polymer can have a weight average molecular weight (Mw) of from about 5,000 to about 500,000 g/mol, or from about 7,500 to about 300,000 g/mol, or from about 10,000 to about 200,000 g/mol, or from about 25,000 to about 175,000 g/mol.

Weight-average molecular weight, $M_w$, molecular weight distribution (MWD) or $M_w/M_n$ where $M_n$ is the number-average molecular weight, and the branching index, g'(vis), are characterized using a High Temperature Size Exclusion Chromatograph (SEC), equipped with a differential refractive index detector (DRI), an online light scattering detector (LS), and a viscometer. Experimental details not shown below, including how the detectors are calibrated, are described in: T. Sun, P. Brant, R. R. Chance, and W. W. Graessley, Macromolecules, Volume 34, Number 19, pp. 6812-6820, 2001. In one or more embodiments, the polymer blend can have a polydispersity index of from about 1.5 to about 6.

Solvent for the SEC experiment is prepared by dissolving 6 g of butylated hydroxy toluene as an antioxidant in 4 L of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing the dry polymer in a glass container, adding the desired amount of TCB, then heating the mixture at 160° C. with continuous agitation for about 2 hr. All quantities are measured gravimetrically. The TCB densities used to express the polymer concentration in mass/volume units are 1.463 g/mL at room temperature and 1.324 g/mL at 135° C. The injection concentration ranges from 1.0 to 2.0 mg/mL, with lower concentrations being used for higher molecular weight samples. Prior to running each sample the DRI detector and the injector are purged. Flow rate in the apparatus is then increased to 0.5 mL/min, and the DRI was allowed to stabilize for 8-9 hr before injecting the first sample. The LS laser is turned on 1 to 1.5 hr before running samples. As used herein, the term "room temperature" is used to refer to the temperature range of about 20° C. to about 23.5° C.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm$^3$, molecular weight is expressed in kg/mol, and intrinsic viscosity is expressed in dL/g.

The light scattering detector used is a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$[K_o c/\Delta R(\theta,c)] = [1/MP(\theta)] + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers.

The molecular weight averages are usually defined by considering the discontinuous nature of the distribution in which the macromolecules exist in discrete fractions i containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w = \Sigma w_i M_i = \Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i$$

The number-average molecular weight, $M_n$, is defined as the sum of the products of the molecular weight $M_i$ of each fraction multiplied by its mole fraction $x_i$:

$$M_n = \Sigma x_i M_i = \Sigma N_i M_i / \Sigma N_i$$

since the mole fraction $x_i$ is defined as $N_i$ divided by the total number of molecules:

$$x_i = N_i / \Sigma N_i.$$

In the SEC, a high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g', also referred to as g'(vis)) is calculated using the output of the SEC-DRI-LS-VIS method as follows. The average intrinsic viscosity $[\eta]_{avg}$, of the sample is calculated by:

$$[\eta]_{avg} = \frac{\sum c_i [\eta]_i}{\sum c_i}$$

where the summations are over the chromatographic slices, i, between the integration limits The branching index g' is defined as:

$$g' = \frac{[\eta]_{avg}}{k M_v^\alpha}$$

where k=0.000579 and α=0.695 for ethylene polymers; k=0.0002288 and α=0.705 for propylene polymers; and k=0.00018 and α=0.7 for butene polymers.

$M_v$ is the viscosity-average molecular weight based on molecular weights determined by the LS analysis:

$$M_v = (\Sigma c_i M_i^\alpha / \Sigma c_i)^{1/\alpha}.$$

In one or more embodiments, the semi-crystalline polymer of the polymer blend may have a viscosity (also referred to a Brookfield viscosity or melt viscosity), measured at 190° C. and determined according to ASTM D-3236 from about 100 cP to about 500,000 cP, or from about 100 to about 100,000 cP, or from about 100 to about 50,000 cP, or from about 100 to about 25,000 cP, or from about 100 to about 15,000 cP, or from about 100 to about 10,000 cP, or from about 100 to about 5,000 cP, or from about 500 to about 15,000 cP, or from about 500 to about 10,000 cP, or from about 500 to about 5,000 cP, or from about 1,000 to about 10,000 cP, wherein 1 cP=1 mPa·sec.

The polymers that may be used in the adhesive compositions disclosed herein generally include any of the polymers according to the process disclosed in International Publication No. 2013/134038. The triad tacticity and tacticity index of a polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

C. Tackifier

The term "tackifier" is used herein to refer to an agent that allows the polymer blend of the composition to be more adhesive by improving wetting during the application. Tackifiers may be produced from petroleum-derived hydrocarbons and monomers of feedstock including tall oil and other polyterpene or resin sources. Tackifying agents are added to give tack to the adhesive and also to modify viscosity. Tack is required in most adhesive formulations to allow for proper joining of articles prior to the HMA solidifying. As used herein, the term "tackifier" includes one or more tackifiers.

"Softening Point" is the temperature, measured in ° C., at which a material will flow, as determined by ASTM E-28, (Revision 1996). Softening Point of one or more tackifiers is calculated by formula I, as described by Fox. T. G., Flory, P. J. in *Second-Order Transition Temperatures and Related Properties of Polystyrene*, Journal of Applied Physics 21, 581-591 (1950).

$$\frac{1}{\text{Tackifier Blend Softening Point}} = \sum \left( \left( \frac{\text{Tackifier1 wt \%}}{\text{Tackifier1 Softening Point}} \right) + \left( \frac{\text{Tackifier2 wt \%}}{\text{Tackifier2 Softening Point}} \right) + \ldots \right) \quad (I)$$

"Aromaticity" is the integration of aromatic protons versus an internal standard (1, 2 dichloroethane) given as weight percent of equivalent styrene, (104 g/mol). Aromaticity is determined by $^1$HNMR spectroscopy and is measured in mol % of aromatic protons.

"Cloud Point" of the one or more tackifiers is the temperature at which one or more tackifiers, dissolved in particular solvent, is no longer completely soluble (as determined by a cloudy appearance of the tackifier/solvent mixture). The Cloud Point of the present invention was determined using a modified ASTM D-611-82 method, substituting methylcyclohexane for the heptane used in the standard test procedure. The procedure used tackifier/aniline/methycyclohexane in a ratio of about 1/2/1 (5 g/10 mL/5 mL). The Cloud Point was determined by cooling a heated, clear blend of the three components until a complete turbidity occurs.

The present invention includes newly designed tackifiers prepared according to methods known in the industry. Tackifiers A-R were prepared by varying the feed stream in a thermal polymerization unit known in the art to achieve a certain tackifier cloud point. After processing in the thermal polymerization unit, the tackifiers were Nitrogen-stripped at 200° C. Each grade of tackifier was subjected to different stripping conditions to achieve a target softening point, resulting in 18 uniquely designed tackifiers. The properties of the newly designed tackifiers are provided in the tables disclosed herein.

The resins described above may be produced by methods generally known in the art for the production of hydrocarbon resins. See for example, the Kirk-Othmer Encyclopedia of Chemical Technology, 4th ed., Vol. 13, pp. 717-744. A preferred method for production of the resins described above is by thermally or catalytically polymerizing petroleum fractions. These polymerizations may be batch, semi-batch or continuous. Petroleum fractions containing aliphatic $C_5$ to $C_6$ linear, branched, alicyclic monoolefins, diolefins, alicyclic $C_{10}$ diolefins can be polymerized. The aliphatic olefins can comprise one or more natural or synthetic terpenes, preferably one or more of alpha-pinene, beta-pinene, delta-3 carene, dipentene, limonene or isoprene dimers. $C_8$-$C_{10}$ aromatic olefinic streams containing styrene, vinyl toluenes, indene, methyl-indenes can also be polymerized as such or in mixture with the aliphatic streams.

Thermal polymerization is usually carried out at a temperature between 160° C. and 320° C., e.g., at about 250° C., for a period of 0.5 to 9 hours, typically 1.5 to 4 hours.

The polymeric resin so produced is dissolved in an inert, de-aromatized or non-de-aromatized hydrocarbon solvent such as Exxsol™ or Varsol™ or base White spirit in proportions varying from 10% to 60% and preferably in the region of 30% by weight polymer. Hydrogenation is then conducted in a fixed-bed, continuous reactor with the feed flow being either an upflow or downflow liquid phase or trickle bed operation.

Hydrogenation treating conditions generally include reactions ranging in temperature of from about 100° C. to about 350° C., preferably ranging from about 150° C. to about 300° C., more preferably ranging from about 160° C. to about 270° C. The hydrogen pressure within the reactor should not exceed more than 2000 psi, preferably no more than 1500 psi, and most preferably no more than 1000 psi. The hydrogenation pressure is, however, a function of the hydrogen purity and the overall reaction pressure should be higher if the hydrogen contains impurities to give the desired hydrogen pressure. Typically the optimal pressure used is between about 750 psi and 1500 psi, preferably between about 800 psi and about 1000 psi. The hydrogen to feed volume ratio to the reactor under standard conditions (25° C., 1 atm pressure) typically can range from about 20 to about 200. Further description of exemplary methods for preparing the tackifiers described herein may be found in U.S. Pat. No. 6,433,104, which is incorporated by reference herein.

D. Additives

The HMA composition can include other additives, e.g., waxes, antioxidants, and combinations thereof either alone or in combination with one or more tackifiers disclosed herein.

The term "antioxidant" is used herein to refer to high molecular weight hindered phenols and multifunctional phenols. A useful commercially available antioxidant is Irganox™1010, a hindered phenolic antioxidant available from BASF SE Corporation located in Ludwigshafen, Germany. The invention is not limited to Irganox 1010 as the antioxidant. In embodiments, other antioxidants that may be used with the polymer blends of the invention, including, but are not limited to amines, hydroquinones, phenolics, phosphites, and thioester antioxidants.

The term "wax" is used herein to refer to a substance that adjusts the overall viscosity of the adhesive composition. The primary function of wax is to control the set time and cohesion of the adhesive system. Adhesive compositions of the present invention may comprise paraffin (petroleum) waxes and microcrystalline waxes. In embodiments, the adhesive compositions may have no wax. In embodiments, other waxes may be used with the polymer blends of the invention including, but not limited to, Castor Oil derivatives (HCO-waxes), ethylene co-terpolymers, Fisher-Tropsch waxes, microcrystalline, paraffin, polyolefin modified, and polyolefin. A useful commercially available wax includes, but is not limited to, Polywax™3000 available from Baker Hughes.

The term "functionalized polyolefin" is used herein to refer to maleic anhydride-modified polypropylene and maleic anhydride-modified polypropylene wax, such as those commercially available from Honeywell. Preferably, the adhesive composition is substantially free of the functionalized polyolefin. The use of a functionalized polyolefin in the present invention is not preferred given that use of such compounds is known to result in a yellowing/discoloration of the adhesive and is also subject to food regulations in parts of Europe.

E. Applications of Polyolefin Adhesive Compositions

The adhesive formulations disclosed herein can be used in various low temperature packaging articles. The packaging article may be useful as a carton, container, crate, case, corrugated case, or tray, for example. More particularly, the packaging article may be useful as a frozen food product, beer packaging, paper bag, drinking cup, milk carton, juice carton, drinking cup, or as a container for shipping produce or meat. The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

EXAMPLES

"Peel Adhesion Failure Temperature" or "PAFT" is defined as the temperature at which the adhesive bond of the composition fails. PAFT of a hot melt adhesive composition is tested according to the standard PAFT test based on ASTM D-4498. PAFT is a critical factor for storing boxes in environments above ambient temperature, such as warehouses. PAFT is measured in ° C.

"Set Time" is the minimum time interval, after bonding two substrates, during which the cohesive strength of the bond becomes stronger than joint stress. It represents the time necessary to cool down an adhesive composition and obtain a good bond. Set time is determined by bonding together substrates with the adhesive after the molten adhesive (180° C.) has been dropped onto one of the substrates with an eye dropper. The second substrate is placed on top of the adhesive, and a 500 g weight is placed on top of the second substrate for even application. After a predetermined interval of time, the second substrate is removed and checked for fiber tear. If no fiber tear is found, a longer interval of time is tried. This is continued until fiber tear is found. This length of time is reported as the set time in seconds.

"Fiber Tear" describes the bond strength of the adhesive to the substrate and is measured at temperatures noted in the respective table. Fiber tear is a visual measurement as to the amount of paper substrate fibers that are attached to a bond after the substrates are torn apart. 100% fiber tear means the adhesive is stronger than the substrate and 100% of the adhesive is covered in substrate fibers. Fiber tear is determined by bonding together substrates with the adhesive. A drop of molten adhesive (180° C.) is positioned on one of the substrates. The second substrate is placed on top of the adhesive, and a 500 g weight is placed on top of the second substrate for even application. The adhesive is cooled at the referenced temperature for at least one hour. The substrates are then torn apart and the adhesive is inspected for fiber tear. In the present invention, fiber tear of at least 60% is desired. Preferably, the fiber tear is greater than 90%.

"Failure Mode" is defined as whether the adhesive bonds or fails when used to adhere a substrate to an inland board at a certain temperature. FT indicates fiber tear when the adhesive damages the substrate surface. SF indicates substrate failure or separation of the corrugated. AB indicates adhesive break when the adhesive cracks with partial adhesive transfer. Where there is more than one mode of failure each mode is listed, e.g., AB, FT indicates 1 of the 2 specimens had adhesive break while the other specimen showed fiber tear.

To apply the adhesive to the substrate, one or more polymer blends, optionally with other additives, including one or more tackifiers, one or more waxes, and one or more antioxidants, is preheated at the application temperature until the polymer is molten. The molten material is poured into a hot melt tank and allowed to equilibrate. The pump speed is set and the add-on is calculated based on the amount of adhesive that passes through the nozzle in a given time.

In a pilot plant, propylene-ethylene copolymers are produced by reacting a feed stream of propylene with a feed stream of ethylene in the presence of a metallocene catalyst. The adhesive blends presented in the Tables below are prepared by preheating the blend of one or more tackifiers, waxes, and an antioxidant to 177° C. One or more polymer blends is slowly added in a heated mantle at 177° C. to the molten liquid of tackifier, wax, and antioxidant until all of the polymer has been added and is completely blended. The components are blended by manual stirring using a spatula until all polymer pellets are melted and the mixture is homogeneous. The components are stirred for an additional 10 minutes. The adhesive blend is removed from the heating mantle, and poured onto release paper. After the adhesive blend solidifies, it is cut into small pieces for testing.

The polymer blends used in the examples of the invention are listed in Table 1 and were generally produced in accordance with the method disclosed in International Publication No. 2013/134038. The invention is not limited to the polymer blends of Table 1. The comparative example (referred to herein as Comparative or Control) is the commercially available premium grade of hot melt adhesives for use in packaging applications by H. B. Fuller: Advantra® PHC9256.

Table 2 shows the effect of the selection of commercial tackifier on the physical properties of the adhesive formulation. Specifically, Table 2 shows eight adhesive formulations having Polymer Blend A, 7.5 wt % of a wax, 15 wt % of a commercial tackifier, and an antioxidant. Physical testings of the formulations were performed to determine the set time, fiber tear and failure mode (at various temperatures), and PAFT. While all formulations displayed suitable room temperature properties, Formulations 5A and 8A displayed favorable low temperature (−18° C.) fiber tear values without compromising set time or PAFT. Table 2 shows that the selection of tackifiers used in an adhesive formulation, event at 15 wt % values, effects the end properties of the adhesive.

Table 3 shows eight adhesive formulations having Polymer Blend A, 7.5 wt % wax, 15 wt % of an inventive or commercial tackifier, and an antioxidant. Formulations with Tackifier C and D showed suitable low temperature (−18° C.) fiber tear and failure mode properties without compromising set time. Formulation 7B, having Polymer Blend B, displayed superior −18° C. fiber tear and PAFT values but had a longer set time, as compared to Formulation 1B, having Polymer Blend A. Likewise, similar effects are shown when comparing Formulation 8B and 4B.

Table 4 shows 7 formulations having Polymer Blend A, an inventive tackifier, wax, and an antioxidant and 7 formulations having Polymer Blend B, an inventive tackifier, wax, and an antioxidant. The inventive tackifiers (A-D and E-I) evaluated in Table 4 had similar aromaticity and softening point, but different Cloud Point values. Generally, low temperature performance is improved with lower cloud point tackifiers. As compared to the commercial tackifiers evaluated in Table 2, the inventive tackifiers of the invention showed improved low temperature performance at 86-104° C. softening points, 9-10 mol % aromaticities, and 46-49° C. Cloud Point values.

Table 5 shows 4 adhesive formulations with another set of inventive tackifiers (J-M), Polymer Blend A, wax, and an antioxidant. Formulations 2D-4D showed improved low temperature (−18° C.) fiber tear performance as compared to the comparative formulations. These tackifiers had lower cloud point values and slightly higher aromaticity content as compared to the tackifiers evaluated in Table 4, and generally displayed improved 3° C. and −18° C. performance.

Table 6 shows 5 adhesive formulations with Polymer Blend A or B, another set of inventive tackifiers (N-R), a wax, and an antoxidant. The tackifiers evaluated in Table 6 have event lower cloud point values than those evaluated in Table 5, but generally showed consistently good low temperature fiber tear and failure mode values without compromising set time and PAFT. Table 6 shows that the selection of polymer blend also effects the end properties of the adhesive and that certain tackifiers are better suited with certain polymer blends.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition which persons in the pertinent art have given, as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

TABLE 1

| Polymer Blend | Viscosity at 190° C., cP | Shore Hardness C | Ethylene Content, % | Tc, ° C. |
| --- | --- | --- | --- | --- |
| Polymer Blend A | 1,850 | 45 | 7 | 65° C. |
| Polymer Blend B | 1,200 | 51 | 7 | 50° C. |

TABLE 2

| Adhesive Formulation (wt % Adhesive) | Set Time (sec) | % Fiber Tear, Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 1A  77 Polymer Blend A<br>7.5 Polywax ™3000<br>15 Escorez ™5690<br>0.5 Irganox ™ 1010 | 1.5-1.7 | 97/0/60,<br>FT/AB/FT | 47 | 10 | 91 | |
| 2A  77 Polymer Blend A<br>7.5 Polywax ™3000<br>15 Escorez ™5615<br>0.5 Irganox ™ 1010 | 1.7-2 | 100/0/81,<br>FT/AB/FT | 43 | 10 | 118 | |
| 3A  77 Polymer Blend A<br>7.5 Polywax ™3000<br>15 Escorez ™5320<br>0.5 Irganox ™ 1010 | 1.5-1.7 | 90/0/66,<br>FT/AB/FT; AB | 45 | | 124 | |
| 4A  77 Polymer Blend A<br>7.5 Polywax ™3000<br>15 Escorez ™5400<br>0.5 Irganox ™ 1010 | 1.5-1.7 | 99/6/47,<br>FT/AB; AF/FT; AB | 43 | | 103 | |
| 5A  77 Polymer Blend A<br>7.5 Polywax ™3000<br>15 Escorez ™5637<br>0.5 Irganox ™ 1010 | 1.5 | 100/51/92,<br>FT/AB/FT | 50 | 5 | 130 | |
| 6A  77 Polymer Blend A<br>7.5 Polywax ™3000<br>15 Escorez ™5380<br>0.5 Irganox ™ 1010 | 1.3-1.5 | 91/29/18,<br>FT/AB/AF; AB | 42 | | 86 | |
| 7A  77 Polymer Blend A<br>7.5 Polywax ™3000<br>15 Escorez ™5340<br>0.5 Irganox ™ 1010 | 1.7-2 | 97/44/30,<br>FT/FT; AB/AB | 52 | | 140 | |
| 8A  77 Polymer Blend A<br>7.5 Polywax ™3000<br>15 Escorez ™5600<br>0.5 Irganox ™ 1010 | 1.3-1.5 | 96/38/92,<br>FT/AB; AF/FT | 43 | 10 | 103 | |
| Control - Advantra 9256 | 1.5 | 93/45/80,<br>FT/AB/FT | | | | |

TABLE 3

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 1B  77 Polymer Blend A<br>7.5 Polywax ™3000<br>15 Tackifier A<br>0.5 Irganox ™ 1010 | 1.3 | 85/18/82,<br>FT/AB; FT/FT | 42 | 9 | 104 | 43 |
| 2B  77 Polymer Blend A<br>7.5 Polywax ™3000<br>15 Tackifier B<br>0.5 Irganox ™ 1010 | 1.3 | 92/17/88,<br>FT/AB/FT | 43 | 9 | 95 | 44 |
| 3B  77 Polymer Blend A<br>7.5 Polywax ™3000<br>15 Tackifier C<br>0.5 Irganox ™ 1010 | 1-1.3 | 93/28/90,<br>FT/AB; FT/FT | 45 | 9 | 102 | 44 |
| 4B  77 Polymer Blend A<br>7.5 Polywax ™3000<br>15 Tackifier D<br>0.5 Irganox ™ 1010 | 1-1.3 | 98/27/80,<br>FT/AB; FT/FT | 47 | 10 | 102 | 46 |
| 5B  77 Polymer Blend A<br>7.5 Polywax ™3000<br>15 Escorez ™2203<br>0.5 Irganox ™ 1010 | 1-1.3 | 76/0/12,<br>FT/AB/FT; AB | 40 | 3 | 93 | |

TABLE 3-continued

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 6B 77 Polymer Blend A<br>7.5 Polywax ™3000<br>15 Escorez ™1102<br>0.5 Irganox ™ 1010 | 1.3-1.5 | 42/10/33,<br>AB; FT/AB/FT; AB | 50 | | 100 | |
| 7B 77 Polymer Blend B<br>7.5 Polywax ™3000<br>15 Tackifier A<br>0.5 Irganox ™ 1010 | 1.5 | 100/60/70,<br>FT/AB/FT; AB | 56 | 9 | 104 | 43 |
| 8B 77 Polymer Blend B<br>7.5 Polywax ™3000<br>15 Tackifier D<br>0.5 Irganox ™ 1010 | 1.5 | 100/40/40,<br>FT/AB/FT; AB | 65 | 10 | 102 | 46 |

TABLE 4

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 1C 77 Polymer Blend A(B)<br>7.5 Polywax ™3000<br>15 Tackifier E<br>0.5 Irganox ™ 1010 | 1.3-1.5<br>(1.7-2) | 100/80/94,<br>FT/AB; FT/FT<br>(89/0/24),<br>(FT/AB/AB) | 40<br>(50) | 9 | 86 | 48 |
| 2C 77 Polymer Blend A(B)<br>7.5 Polywax ™3000<br>15 Tackifier F<br>0.5 Irganox ™ 1010 | 1.3-1.5<br>(1.7) | 100/62/93,<br>FT/AB/FT<br>(90/0/30),<br>(FT; AB/AB/AB; FT) | 41<br>(46) | 9 | 101 | 47 |
| 3C 77 Polymer Blend A(B)<br>7.5 Polywax ™3000<br>15 Tackifier G<br>0.5 Irganox ™ 1010 | 1.5<br>(1.5-1.7) | 100/79/90,<br>FT/AB; FT/FT<br>(87/0/2),<br>(FT; AB/AB/AB) | 43<br>(50) | 9 | 100 | 49 |
| 4C 77 Polymer Blend A(B)<br>7.5 Polywax ™3000<br>15 Tackifier H<br>0.5 Irganox ™ 1010 | 1.5-1.7<br>(1.7) | 100/65/98,<br>FT/AB; FT/FT<br>(93/0/35),<br>(FT/AB/AB; FT) | 43<br>(45) | 9 | 98 | 48 |
| 5C 77 Polymer Blend A(B)<br>7.5 Polywax ™3000<br>15 Tackifier I<br>0.5 Irganox ™ 1010 | 1.3<br>(1.7-2) | 99/59/98,<br>FT/FT; AB/FT<br>(85/0/18),<br>(FT/AB/AB; 1FT) | 42<br>(47) | 9 | 103 | 49 |
| 6C 77 Polymer Blend A(B)<br>7.5 Polywax ™3000<br>15 Tackifier A<br>0.5 Irganox ™ 1010 | 1.3<br>(1.5) | 100/18/98,<br>FT/FT/FT<br>(100/60/70),<br>(FT/AB/FT; AB) | 44<br>(56) | 9 | 104 | 43 |
| 7C 77 Polymer Blend A(B)<br>7.5 Polywax ™3000<br>15 Tackifier D<br>0.5 Irganox ™ 1010 | 1.3-1.5<br>(1.5) | 98/11/94,<br>FT/AB; FT/FT<br>(100/40/40),<br>(FT/AB/FT; AB) | 40<br>(65) | 10 | 102 | 46 |

TABLE 5

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 1D 77 Polymer Blend A<br>7.5 Polywax ™3000<br>15 Tackifier J<br>0.5 Irganox ™ 1010 | 1.5-1.7 | 80/6/33,<br>FT/AB/AB; FT | 35 | 12 | 68 | 72 |

TABLE 5-continued

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 2D 77 Polymer Blend A<br>7.5 Polywax ™3000<br>15 Tackifier K<br>0.5 Irganox ™ 1010 | 1.3-1.5 | 92/80/96,<br>FT/FT/AB; FT | 38 | 14 | 59 | 70 |
| 3D 77 Polymer Blend A<br>7.5 Polywax ™3000<br>15 Tackifier L<br>0.5 Irganox ™ 1010 | 1.3-1.5 | 97/58/96,<br>FT/FT/FT | 36 | 10 | 63 | 72 |
| 4D 77 Polymer Blend A<br>7.5 Polywax ™3000<br>15 Tackifier M<br>0.5 Irganox ™ 1010 | 1.3 | 96/75/74,<br>FT/FT/FT | 44 | 13 | 59 | 69 |
| Control - Advantra 9256 | 1.5 | 92/17/22,<br>FT/AB/AB | | | | |

TABLE 6

| Adhesive Formulation (wt % Adhesive) | Set Time (sec) | % Fiber Tear & Failure Mode (Room Temp/−18° C./3° C.) | Avg. PAFT (° C.) | Tackifier Aromatic mol. % | Softening Point (° C.) | Cloud Point (° C.) |
|---|---|---|---|---|---|---|
| 1E 77 Polymer Blend A(B)<br>7.5 Polywax ™3000<br>15 Tackifier N<br>0.5 Irganox ™ 1010 | 1.5<br>(1.5-1.7) | 89/0/61,<br>FT/AB/FT; AB<br>(56/0/0),<br>(AB; FT/AB/AB) | 37 | 7 | 85 | 63 |
| 2E 77 Polymer Blend A(B)<br>7.5 Polywax ™3000<br>15 Tackifier O<br>0.5 Irganox ™ 1010 | 1.5-1.7<br>(2-2.3) | 95/42/69,<br>FT/FT; AB/FT<br>(68/0/0),<br>(AB; FT/AB/AB) | 40 | 7 | 87 | 64 |
| 3E 77 Polymer Blend A(B)<br>7.5 Polywax ™3000<br>15 Tackifier P<br>0.5 Irganox ™ 1010 | 1.5<br>(2) | 97/60/94,<br>FT/FT; AB/FT<br>(51/0/0),<br>(AB/AB/AB) | 41 | 7 | 87 | 65 |
| 4E 77 Polymer Blend A(B)<br>7.5 Polywax ™3000<br>15 Tackifier Q<br>0.5 Irganox ™ 1010 | 1.3-1.5<br>(2-2.3) | 97/48/90,<br>FT/FT; AB/FT<br>(73/0/0),<br>(AB; FT/AB/AB) | 36 | 7 | 86 | 67 |
| 5E 77 Polymer Blend A(B)<br>7.5 Polywax ™3000<br>15 Tackifier R<br>0.5 Irganox ™ 1010 | 1.3-1.5<br>(2.3) | 96/40/91,<br>FT/FT; AB/FT<br>(45/0/0),<br>(AB/AB/AB) | 40 | 7 | 95 | 59 |
| Control - Advantra 9256 | 1.5 | 92/80/72,<br>FT/FT; AB/FT | | | | |

We claim:

1. An adhesive composition comprising:
   (a) a polymer blend comprising
      a first propylene-based polymer, wherein the first propylene-based polymer is a homopolymer of propylene or a copolymer of propylene and ethylene or a $C_4$ to $C_{10}$ alpha-olefin; a second propylene-based polymer, wherein the second propylene-based polymer is a homopolymer of propylene or a copolymer of propylene and ethylene or a $C_4$ to $C_{10}$ alpha-olefin; wherein the second propylene-based polymer is different than the first propylene-based polymer;
      wherein the polymer blend has a melt viscosity, measured at 190° C. of about 1,000 to about 30,000 cP and a crystallization temperature of greater than 60° C. and
      wherein the polymer blend is present in the amount of about 50 wt % to about 95 wt % of the adhesive composition; and
   (b) a tackifier;
      Wherein the tackifier has a softening point as determined by ASTM E-28 of about 85° C. to about 105° C., an aromaticity of about 5 mol % to about 15 mol % aromatic protons, and a Cloud Point of about 45° C. to about 75° C.

2. The adhesive composition of claim 1, further comprising a wax, wherein the wax is present in the amount of about 5 wt % to about 7.5 wt %.

3. The adhesive composition of claim 1, further comprising an antioxidant.

4. The adhesive composition of claim 1, wherein the composition is free of a functionalized polyolefin, selected from the group consisting of a maleic anhydride-modified polypropylene and a maleic anhydride-modified polypropylene wax.

5. The adhesive composition of claim 1, wherein the tackifier is present in the amount of about 5 wt % to about 50 wt %.

6. The adhesive composition of claim 1, wherein the tackifier has an aromaticity of about 7 mol % to about 12 mol % aromatic protons and a Cloud Point of about 60° C. to about 70° C.

7. The adhesive composition of claim 1, wherein the tackifier has an aromaticity of about 8 mol % to about 12 mol % aromatic protons, and a Cloud Point of about 46° C. to about 50° C.

8. The adhesive composition of claim 1, wherein the polymer blend is a dual reactor blend.

9. The adhesive composition of claim 1, wherein the polymer blend is a solution blend.

10. The adhesive composition of claim 1, wherein the polymer blend is in a form of a polymeric pellet.

11. The adhesive composition of claim 1, wherein the first propylene-based polymer comprises a copolymer of propylene and ethylene, and the second propylene-based polymer comprises a copolymer of propylene and ethylene, wherein the proportion of propylene in the first propylene-based polymer differs from the proportion of propylene in the second propylene-based polymer.

12. An article comprising the adhesive composition of claim 1, wherein the adhesive composition adheres one or more substrates, and wherein at least one of the one or more substrates comprises paper, cardboard, plastic, nonwoven, metal, wood, other natural fiber based material, or combinations thereof.

\* \* \* \* \*